(12) United States Patent
Hasegawa

(10) Patent No.: US 7,124,852 B2
(45) Date of Patent: Oct. 24, 2006

(54) ACCELERATION SENSOR AND ENGINE CONTROL FOR MOTORCYCLE

(75) Inventor: Takahiko Hasegawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/945,311

(22) Filed: Aug. 30, 2001

(65) Prior Publication Data

US 2002/0039951 A1   Apr. 4, 2002

(30) Foreign Application Priority Data

| Sep. 1, 2000 | (JP) | ............................. 2000-265281 |
| Sep. 1, 2000 | (JP) | ............................. 2000-265282 |
| Sep. 1, 2000 | (JP) | ............................. 2000-265283 |

(51) Int. Cl.
*B60K 28/14* (2006.01)

(52) U.S. Cl. .................................................. 180/282

(58) Field of Classification Search ............... 180/282, 180/283, 284; 123/198 D, 198 DB, 396, 123/399, 406.5, 406.51, 492, 493; 200/52 A; 307/10.1, 10.6

See application file for complete search history.

(56) References Cited

U.S. PATENT DOCUMENTS

| 3,034,097 | A | * | 5/1962 | English et al. ............... 340/440 |
| 3,772,643 | A | * | 11/1973 | Dodd et al. .................. 340/440 |
| 3,807,423 | A | * | 4/1974 | Engel ........................... 137/38 |
| 3,840,036 | A | * | 10/1974 | Renk ........................... 137/38 |
| 3,882,957 | A | * | 5/1975 | Fritz ............................ 180/284 |
| 3,915,255 | A | * | 10/1975 | Springer ..................... 180/282 |
| 4,005,724 | A | * | 2/1977 | Courtot ........................ 137/38 |
| 4,221,278 | A | * | 9/1980 | Ponzo .......................... 180/283 |
| 4,275,753 | A | * | 6/1981 | Williams ....................... 137/45 |
| 4,322,714 | A |   | 3/1982 | Morgan ........................ 340/427 |
| 4,390,759 | A | * | 6/1983 | Scieur ........................ 200/52 A |
| 4,447,801 | A |   | 5/1984 | Masuda ........................ 340/459 |
| 4,453,778 | A | * | 6/1984 | Smith et al. ................ 303/22.7 |
| 4,583,612 | A |   | 4/1986 | Parker ........................ 180/227 |
| 4,624,140 | A |   | 11/1986 | Ekchian et al. ........... 73/304 C |
| 4,633,831 | A | * | 1/1987 | Ohkumo ..................... 123/325 |
| 4,664,080 | A | * | 5/1987 | Minks ......................... 123/335 |
| 4,796,716 | A |   | 1/1989 | Masuda ....................... 180/176 |
| 4,848,502 | A |   | 7/1989 | Kikuta et al. ............... 180/179 |
| 4,856,613 | A | * | 8/1989 | Reginold .................... 180/282 |
| 5,033,428 | A | * | 7/1991 | Sasaki ...................... 123/198 D |
| 5,319,557 | A |   | 6/1994 | Juman .......................... 701/97 |
| 5,382,049 | A |   | 1/1995 | Hiramitsu et al. .......... 280/735 |
| 5,445,443 | A |   | 8/1995 | Hauser et al. .............. 303/137 |
| 5,602,371 | A | * | 2/1997 | Kerns et al. ............. 200/61.47 |
| 5,613,571 | A | * | 3/1997 | Rank et al. ................. 180/282 |
| 5,758,301 | A | * | 5/1998 | Saito et al. .................. 701/45 |
| 5,825,098 | A | * | 10/1998 | Darby et al. ............... 307/10.1 |

(Continued)

FOREIGN PATENT DOCUMENTS

DE    198 21 134 A1    12/1999

(Continued)

*Primary Examiner*—Paul N. Dickson
*Assistant Examiner*—Laura B Rosenberg
(74) *Attorney, Agent, or Firm*—Knobbe, Martens, Olson & Bear, LLP

(57) ABSTRACT

A motorcycle has an engine and other components that are controlled based upon output from an acceleration sensor. The motorcycle also has an alarm system that uses the same acceleration sensor to detect vibrations indicative of a potential theft of the vehicle. Various routines of controlling a fuel pump and operation of the engine are disclosed based upon the sensed operating characteristics of the motorcycle.

11 Claims, 9 Drawing Sheets

U.S. PATENT DOCUMENTS

| | | |
|---|---|---|
| 5,835,873 A | 11/1998 | Darby et al. .................. 701/45 |
| 6,038,495 A | 3/2000 | Schiffmann .................... 701/1 |
| 6,139,050 A * | 10/2000 | Bultel et al. ............. 280/730.1 |
| 6,192,305 B1 * | 2/2001 | Schiffmann .................. 701/45 |
| 6,268,794 B1 * | 7/2001 | Tzanev ....................... 340/475 |
| 6,336,648 B1 * | 1/2002 | Bohn ......................... 280/276 |
| 6,417,767 B1 * | 7/2002 | Carlson et al. ............. 340/467 |
| 6,428,118 B1 * | 8/2002 | Blosch ...................... 303/9.64 |
| 6,483,201 B1 * | 11/2002 | Klarer ....................... 307/10.6 |
| 6,536,401 B1 * | 3/2003 | McConnell ............. 123/198 D |

FOREIGN PATENT DOCUMENTS

| | | |
|---|---|---|
| EP | 1 170 181 A2 | 1/2002 |
| JP | 09207706 | 8/1997 |
| WO | WO 01/28820 A2 | 4/2001 |

* cited by examiner

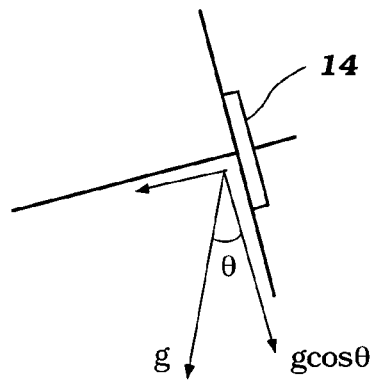
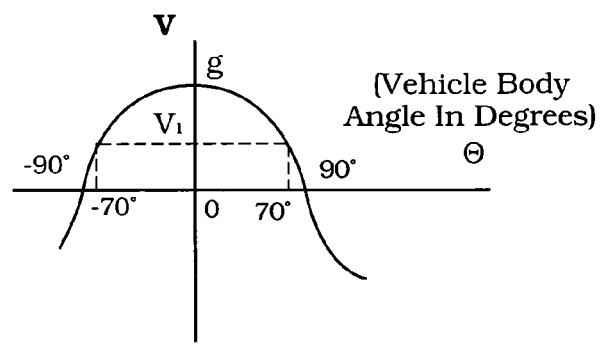
Figure 3a  Figure 3b
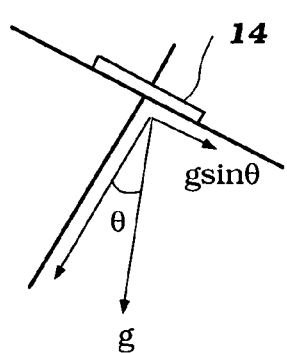
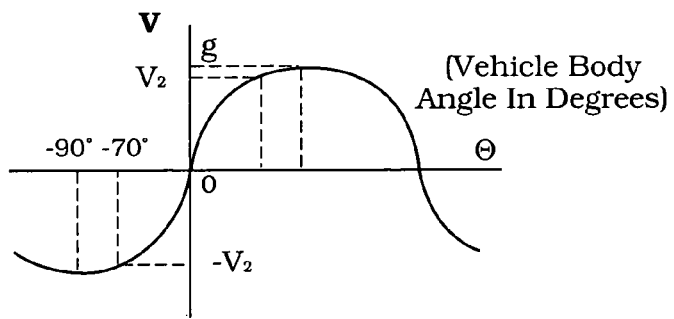
Figure 4a  Figure 4b

ACCELERATION SENSOR AND ENGINE CONTROL FOR MOTORCYCLE

RELATED APPLICATIONS

The present application is based on and claims the priority under 35 U.S.C. § 119 of Japanese Patent Application Nos. 2000-265281, 2000-265282 and 2000-265283, all of which were filed on Sep. 1, 2000, the disclosures of which are hereby incorporated by reference in their entirety.

BACKGROUND OF THE INVENTION

1. Field of the Invention

The present invention generally relates to an acceleration sensor and engine control arrangement for a motor vehicle. More particularly, the present invention relates to an acceleration sensor and controller configuration that controls engine operations depending upon a variety of sensed operational modes.

2. Description of the Related Art

Motorcycles generally comprise a frame with a steerable front wheel and a driven rear wheel. An engine is mounted within the frame between the front wheel and the back wheel. The engine generally comprises at least one piston that reciprocates within a bore formed in the cylinder block. A cylinder head, together with the cylinder bore and the piston, defines a combustion chamber in which an air-fuel mixture is compressed and ignited. A throttle valve may be provided to control the air flow rate into the combustion chamber and a fuel injection system may be provided to control the amount of fuel mixed with the air. An ignition system, including a spark plug, is provided for igniting the air-fuel mixture that is compressed within the combustion chamber by the piston. Ignition and burning of the air-fuel mixture drives the piston downward within the cylinder bore. A connecting rod transfers the reciprocating linear movement of the piston to a rotatable crankshaft.

A controller, such as an electronic control unit ("ECU"), communicates with various engine and motorcycle components. The ECU, in particular, generally controls timing of the ignition system and injection of the fuel injection system based upon data received from various sensors. For instance, in some motorcycles, the ECU receives information regarding the engine speed from an engine speed sensor, the throttle position from a throttle position sensor and engine temperature from a temperature sensor. Based upon this information, various maps are consulted to determine a desired ignition timing and a desired injection amount and timing.

In some arrangements, the engine is not an internal combustion engine. Rather, due to recent governmental regulations, electric vehicles are becoming more popular. The electric vehicles generally employ an ECU to help control output of at least one electric motor based, at least in part, upon operator demand. Nevertheless, an ECU is used to at least partially control motor operation.

Motorcycles generally require operation at a lean angle relative to vertical; the lean angle is used to assist in turning. Unfortunately, motorcycles occasionally tip over or are leaned too far during normal operation. Such tipping can result in fuel being spilled from the fuel supply system and can otherwise adversely affect engine operation. Accordingly, a system is desired that will deactivate the fuel supply system and possibly the engine during such tipping.

Additionally, motorcycles, like all vehicles, can become involved in accidents. During such accidents, the motorcycles are rapidly decelerated due to the impact forces. Such deceleration, again, can terminate in a fuel spill such as that discussed above or in adverse consequences for the engine. Thus, the system preferably can account for rapid deceleration that is indicative of a collision and desirably will deactivate the fuel supply system and possibly the engine in the event of such a collision.

Furthermore, due in part to the higher engine output to vehicle weight ratios, as well as vehicle body design, motorcycles have the ability to raise up on a rear driven wheel during rapid acceleration. This phenomenon often is referred to as a wheelie. Wheelies generally are undesirable because they cause the front steerable wheel to raise off of the ground, for instance. To date, anticipating or detecting such a phenomenon and reducing the likelihood or the length of the phenomenon, however, has been fairly difficult. Accordingly, a system is desired that can correct a wheelie through appropriate detection and correction techniques.

One other issue that desirably could be corrected is the wasting of electricity and the wasting of space when a motorcycle is provided with an alarm system or other theft deterrent device in addition to the basic ECU. While physical locks are functional, they require storage space or complicated mechanical structure. Thus, alarms are preferred from the standpoint of space and simplicity of design. One drawback to alarm systems, however, is the proliferation of electrical components required for such alarm systems and the consequent difficulty in manufacturing an OEM-optional alarm device. In other words, motorcycle manufacturers need to reduce the number of variations in base components, such as circuit boards. Providing an alarm system as an option has heretofore been undesirable due to the need to provide different circuitry for alarm-equipped motorcycles and for non-alarm-equipped motorcycles, respectively. As an alternative, the circuitry could be designed with most of the components necessary for the alarm already present and active on the circuit but the alarm device and other related components not present. This is undesirable, however, because of the increased power consumption that would result. Accordingly, a simple but energy efficient alarm option is desired.

SUMMARY OF THE INVENTION

Each of the above issues can be connected to an appropriate use of an accelerometer. In particular, Applicants have discovered that semiconductor-based accelerometers can remedy most of the above issues in a simple and compact package. Some of the applications and configurations of the accelerometers will be discussed below. It should be noted that the following discussion relates to several distinct features of the present invention and not all of the features need to be present in any single embodiment of the present invention. Thus, some of the features may be used with other features in some applications while other applications will only reflect one of the features.

Accordingly, one aspect of the present invention involves a wheeled vehicle comprising a frame, a front wheel steerably attached to the frame, a rear wheel attached to the frame, and a motive member mounted to the frame and connected to at least one of the front wheel and the rear wheel. A control unit is electrically connected to the motive member and comprises an outer housing. An accelerometer is mounted within the outer housing and electrically communicates with the control unit. The accelerometer is adapted to output a signal that varies with a leaning angle of the vehicle. The control unit is adapted to compare the signal to a threshold signal indicative of a fall angle and the control unit is further adapted to disable the motive member if the signal exceeds the threshold signal.

Another aspect of the present invention involves a wheeled vehicle comprising a frame, a front wheel steerably attached to the frame, a rear wheel attached to the frame, and a motive member mounted to the frame and connected to at least one of the front wheel and the rear wheel. A control unit is electrically connected to the motive member and comprises an outer housing. An accelerometer is mounted within the outer housing and electrically communicates with the control unit. The accelerometer is adapted to output a signal that varies with the rate of forward deceleration. The control unit is adapted to compare the signal to a collision threshold signal and the control unit is further adapted to disable the motive member if the signal exceeds the collision threshold signal.

A further aspect of the present invention involves a wheeled vehicle comprising a frame, a front wheel steerably attached to the frame, a rear wheel attached to the frame, and a motive member mounted to the frame and connected to at least one of the front wheel and the rear wheel. A control unit is electrically connected to the motive member and comprises an outer housing. An accelerometer is mounted within the outer housing and electrically communicates with the control unit. The accelerometer is adapted to output a signal that varies with the rate of forward acceleration. The control unit is adapted to compare the signal to a wheelie threshold signal and the control unit is further adapted to reduce the output of the motive member if the signal exceeds the wheelie threshold signal.

Yet another aspect of the present invention involves a wheeled vehicle comprising a frame, a front wheel steerably attached to the frame, a rear wheel attached to the frame, and a motive member mounted to the frame and connected to at least one of the front wheel and the rear wheel. A battery is supported by the frame. A control unit is electrically connected to the motive member and comprises an outer housing. An accelerometer electrically communicates with the control unit. The control unit evaluates a lean angle of the vehicle based upon output of the accelerometer. The battery is in electrical communication with the accelerometer through a control unit power circuit. An antitheft device is separable from the outer housing and is adapted for selective connection to the control unit and the outer housing. The antitheft device comprises an alarm power circuit that is in electrical communication with an alarm device, a vibration detection circuit and the accelerometer. The vibration detection circuit detects an output from the accelerometer and activates the alarm device when the output from the accelerometer exceeds a preset level.

An additional aspect of the present invention involves a method of controlling operations of a vehicle during an accident. The vehicle has an electronic control unit that comprises a control circuit that is in electrical communication with a semiconductor accelerometer and the electronic control unit is adapted to control operation of a motive member and a fuel pump. The method comprises sensing an output signal from the accelerometer, comparing the output signal with a preset threshold level, and if the output signal exceeds the preset threshold level then disabling the motive member.

One other aspect of the present invention involves a method of controlling operations of a vehicle during acceleration. The vehicle has an electronic control unit that comprises a control circuit that is in electrical communication with a semiconductor accelerometer. The electronic control unit is adapted to control operation of a motive member. The method comprises sensing an output signal from the accelerometer, comparing the output signal with a preset threshold level, and if the output signal exceeds the preset threshold level then decreasing an output of the motive member.

BRIEF DESCRIPTION OF THE DRAWINGS

These and other features, aspects and advantages of the present invention are described in detail below in connection with the accompanying drawings. The drawings comprise 15 figures.

FIG. 3a is a schematic diagram showing the accelerometer mounted vertically with the associated vehicle in a leaning position.

FIG. 3b is a graphical depiction showing accelerometer output voltage with reference to bank angle when the accelerometer is mounted vertically.

FIG. 4a is a schematic diagram showing the accelerometer mounted horizontally with the associated vehicle in a leaning position.

FIG. 4b is a graphical depiction showing accelerometer output voltage with reference to bank angle when the accelerometer is mounted horizontally.

FIG. 12a shows the ECU without an optional alarm system while FIG. 12b shows the ECU of FIG. 12a with the optional alarm system attached.

DETAILED DESCRIPTION OF PREFERRED EMBODIMENTS OF THE PRESENT INVENTION

The Illustrated Vehicle

Figure 1:
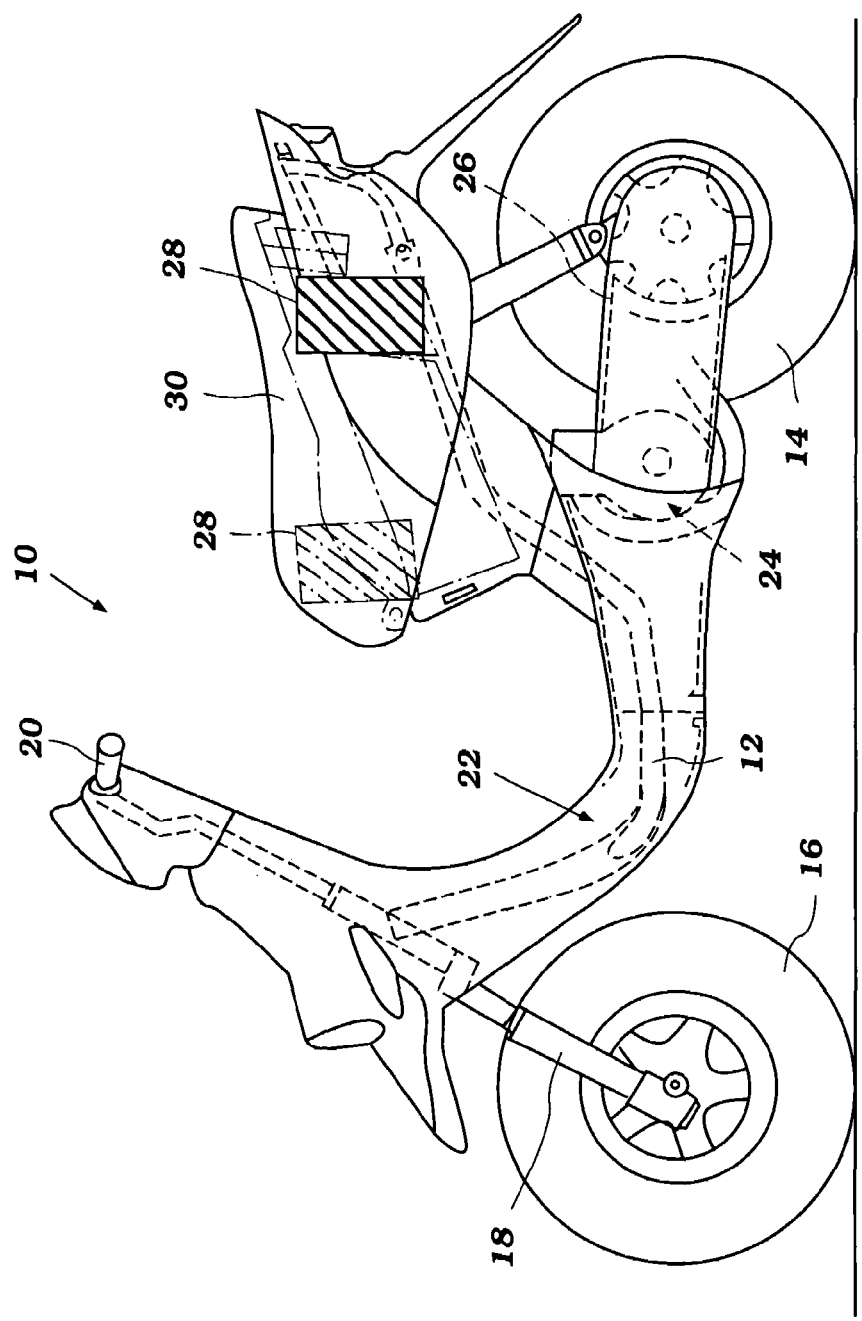
FIG. 1 is a simplified and partially broken out side view of a motorcycle that can be arranged and configured in accordance with certain features, aspects and advantages of the present invention. Some internal components of the motorcycle are illustrated in hidden lines. Additionally, two different positions of an ECU are illustrated, one in solid lines with solid cross-hatching and one in phantom lines with phantom line cross-hatching.

With reference initially to FIG. 1, an overall configuration of a motorcycle 10 that can be used with various features, aspects and advantages of the present invention will be described. The illustrated motorcycle is only one type of motor vehicle that can be used with certain aspects of the present invention. Other vehicles, such as snowmobiles, all terrain vehicles, watercraft, go-karts and the like, also can use other aspects of the present invention.

The illustrated motorcycle 10 generally comprises a frame assembly 12 that is supported by a rear driven wheel 14 and a front steerable wheel 16. The front steerable wheel is connected to the frame assembly 12 by a set of front forks 18. The front forks 18, in turn, are connected to a set of handlebars 20 that can be used to control the direction of travel of the motorcycle 10. Various other operator controls can be disposed proximate the handlebars 20.

A body panel assembly 22 is mounted to the frame assembly 12 and comprises a number of body panels that, together, encase many of the moving components of the vehicle. Within the body panel assembly 22, a motive member 24, such as an internal combustion engine or an electric motor, is mounted. The motive member 24 is drivingly connected to the rear wheel 14 in the illustrated arrangement by a suitable drive chain or belt drive 26.

The illustrated motorcycle 10 employs an electronic control unit (ECU) 28 to control the output of the motive member 24 as well as a number of related components. The ECU 28 can be contained within a single housing that is mounted to a frame assembly or body panel of the vehicle. In some applications, the ECU 28 can be mounted directly to the body of an engine which is controlled by the ECU 28. The ECU 28 desirably is mounted beneath a seat 30 of the vehicle. In the illustrated arrangement, two alternative locations are shown: one in phantom lines and one in solid lines.

The Control System

Figure 2:
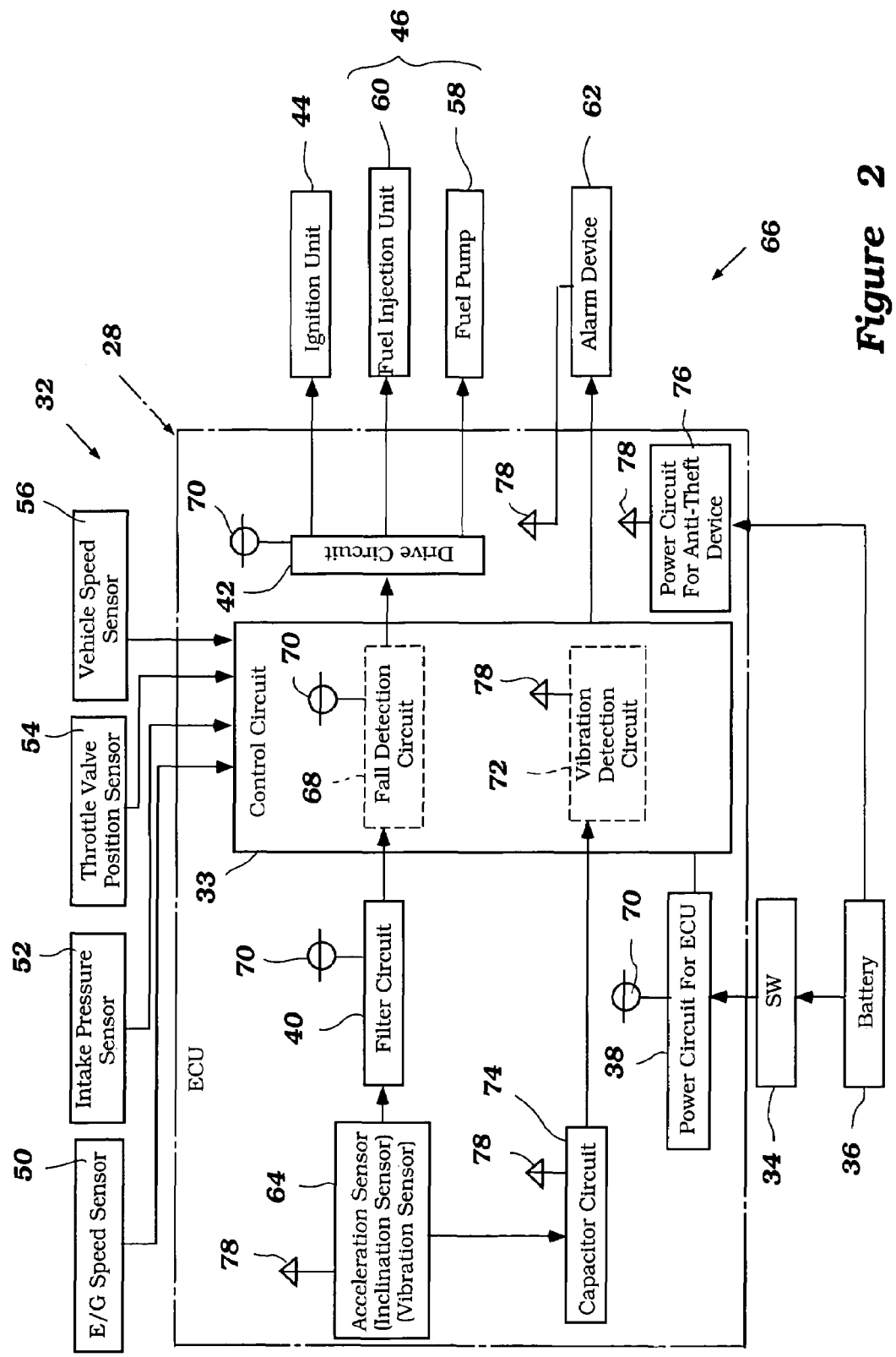
FIG. 2 is a schematic diagram showing the ECU with various inputs and outputs that can be used in accordance with certain features, aspects, and advantages of the present invention.

The ECU 28 forms a portion of a control system 32 that is arranged and configured in accordance with certain features, aspects and advantages of the present invention. In this regard, the ECU 28 preferably includes a control circuit 33 that comprises components that will be described below. In addition, the control circuit 33 preferably comprises a number of semiconductor elements that can include calculating circuits and memory circuits. In one arrangement, the control circuit is made by mounting semiconductor elements, such as the memory circuits and the calculating circuits, on a printed circuit board. With reference now to FIG. 2, an exemplary arrangement of components that comprise at least a portion of this control system will be described in greater detail.

The ECU 28, and the control circuit 33 in particular, receives input from a variety of sensors and other components. Each of the inputs can be passed through a suitable filter, if desired. The vehicle also preferably comprises a main switch 34. The main switch 34 controls a flow of electrical power from a battery 36 to electrical components of the vehicle. For instance, in the illustrated arrangement, the main switch 34 controls the flow of electrical power through a power circuit 38 for the ECU 28. Power from the power circuit 38 is provided to the control circuit 33. The main switch 34 of the illustrated arrangement also controls the flow of power to a filter circuit 40 and to a drive circuit 42, which will be described in greater detail below and which preferably are mounted to the same printed circuit board as the control circuit 33.

In some arrangements, the main switch 34 also controls starting of the vehicle. The main switch 34 can assume any desired configuration but, in one arrangement, the main switch 34 is a key operated three-position switch with an off position, an on position and an on-starting position. A key is turned to place the switch in the on-starting position to begin engine operation and is returned to the on position during normal operation.

In one preferred arrangement, regardless of whether the engine has started, when the switch is in the on position, a fuel supply system 46 becomes operational to allow sufficient pressure to be developed within the fuel supply lines for fuel injection. Thus, in that arrangement, when the switch is placed in the on position before being placed in the on-starting position, electricity is allowed to flow to the various electrically powered components, including the ECU power circuit 38, the filter circuit 40 and the drive circuit 42, that is associated with an ignition unit 44 and the fuel supply system 46. The switch then can be placed in the off position to terminate engine operation.

The ECU 28 preferably receives a signal from an engine speed sensor 50, an intake (e.g., manifold) pressure sensor 52, a throttle valve position sensor 54 and a vehicle speed sensor 56. These sensors preferably are arranged to input a signal to the ECU 28 and can have any suitable construction. Advantageously, these sensors input signals indicative of operational conditions of the engine, an intake system associated with the engine and the motorcycle 10. It should be noted that the operational conditions of the intake system often correlate to operator demand and, as such, a sensor that detects operator demand can be used in electrical motor powered applications.

The engine speed sensor 50 preferably determines a crankshaft speed of the engine. The sensor 50 can be incorporated with a flywheel magneto or can have any other suitable construction. The speed of other shafts associated with the engine or its output also can be used as the basis for determining engine speed if desired.

The intake pressure sensor 52 can have any suitable construction and preferably is mounted within the induction system in any suitable position. The pressure sensor 52 can detect absolute pressure or pressure changes. In some applications, the rate of pressure change also can be sensed, if desired.

The throttle valve position sensor (i.e., throttle opening sensor) 54 can have any suitable construction. Preferably, the throttle valve position sensor 54 detects operator demand by evaluating the degree to which a throttle valve within the induction system of the engine is opened. In some applications, the rate of throttle valve opening also can be detected. In other applications, the position of the throttle control lever, which is operated by the vehicle operator, can be detected as a proxy from throttle valve position. This latter application may be useful in electrical vehicle applications.

With respect to the vehicle speed sensor 56, any suitable vehicle speed sensor can be used. In one arrangement, wheel speed is detected and converted into a vehicle speed for use by the ECU 28 and for output that can be used with informational display arrangements (i.e., speedometers).

Of course, other sensors can be connected to the ECU 28. Sensors, such as various engine temperature sensors, oil pressure sensors, etc. that are not shown can be connected to the ECU 28 for control of engine operations in any suitable manner.

Output from the ECU 28 is communicated to a number of engine and vehicle components. For instance, the ECU 28 provides control signals to the ignition unit 44 and the fuel supply system 46. In the illustrated arrangement, the fuel supply system generally comprises a fuel pump 58 that supplies pressurized fuel to a fuel injector 60. Of course, other components, including an alarm device 62 and a lubrication pump, also can be controlled by the ECU 28 according to various control arrangements.

The ignition unit 44 in the illustrated arrangement preferably comprises an ignition coil for producing sparks with spark plugs in any suitable manner. In some arrangements, the ignition unit 44 is a CDI (capacitor discharge ignition) system while, in other arrangements, the ignition unit 44 is a TCI (transistor controlled ignition) system.

The fuel supply system 46 preferably comprises the fuel injector 60, which can include a solenoid that is selectively actuated to supply fuel for combustion. The fuel supply system also comprises the fuel pump 58 that supplies fuel to the fuel injector under pressure. In a presently preferred arrangement, the fuel pump 58 is electrically powered. Depending upon the received data, such as from the identified sensors above, the ECU 28 controls operation of the ignition unit 62 and the fuel supply system 64 via the drive circuit 42 based upon various program routines and maps. Suitable routines and maps are well known for controlling normal engine operation.

The Acceleration Sensor

The ECU 28 also receives a signal from an acceleration sensor 64. The acceleration sensor 64 generally is used to detect the gravitational acceleration acting on the motorcycle body in amounts varying according differing movements of the motorcycle body. The acceleration sensor 64 preferably is a semiconductor-type of acceleration sensor. In particular, the acceleration sensor 64 preferably is a capacitance sensing accelerometer. In this type of accelerometer, micromachined capacitive plates form a mass. As acceleration deforms (i.e., alters the spacing between) the plates, a measurable change in capacitance results. This change in capacitance is then detected to indicate a change in acceleration of the associated vehicle. In one particularly advantageous construction, the acceleration sensor 64 is an x-y sensor that can sense acceleration in two directions that are normal to each other.

The output from the acceleration sensor 64 preferably passes through the filter circuit 40 before being input into the control circuit 33. The filter 40 can be used to remove noise that results from irregularities in the road surface and other vibrations encountered during operation of the motorcycle. The filter circuit 40 can be hardwired or can be software implemented or both. In addition, a time delay can be used as a substitute for the filter circuit 40 or can comprise at least a portion of the filter circuit 40.

The acceleration sensor (i.e., accelerometer) 64 can be mounted in any suitable location. In one application, the accelerometer 64 can be integrally mounted on the same circuit board of the ECU 28 along with the filter circuit 40 and the control circuit 33 within the ECU 12. In some arrangements, the accelerometer 64 can be mounted to the control circuit 33. In other arrangements, the accelerometer 64 can be mounted external to the ECU 28; however, by mounting the accelerometer 64 within the ECU 28, space for the accelerometer within the engine compartment is not needed and the space can be dedicated to other vehicle components. Preferably, the accelerometer 64 can be mounted such that, once installed on the motorcycle 10, the accelerometer is generally horizontally disposed rather than vertically for reasons that will be discussed below with reference to FIGS. 3a, 3b, 4a and 4b.

FIG. 3a schematically illustrates an arrangement in which the accelerometer 64 has been mounted in a generally vertical orientation. As illustrated, a signal of the accelerometer 64 will register movement about a generally vertical axis by registering the change relative to gravity g. Preferably, the output signal is a predetermined voltage that varies with movement of the motorcycle. Due to its construction, the voltage output from the accelerometer 64 is a function of the leaning angle of the motorcycle 10. In particular, the output can be calculated as $V=g*COS(\Theta)$, where $\Theta$ is the leaning angle of the motorcycle measured from vertical and g is the force of gravity. Of course, varied constants can be used to control the voltage levels that are output. In other words in this equation, it has been assumed that the value of V will be a maximum of g when the motorcycle is standing straight up but other maximum values can be used.

With reference now to FIG. 3b, a graphical depiction is provided that shows output voltage of the vertically mounted accelerometer 64 over a range of leaning movement of the motorcycle. In particular, the illustrated range encompasses movement in which the vehicle moves from laying on one side to vertical to laying on the other side. As such, the voltage output from the accelerometer 64 ranges from 0 volts to 1 g volt to 0 volts along a cosine curve. In one arrangement, when the motorcycle 10 is leaning at about 70 degrees relative to vertical, the output voltage from the accelerometer is about equal to $V=g* COS(70°)$ and, thus, V=0.34 g. Thus, when moving from vertical to about 70 degrees the sensor output changes 1 g–0.34 g=0.66 g. When the difference from 70 degrees to 90 degrees is calculated the difference is about 0.34 g, thus a large range of output exists between about 70 degrees to about 90 degrees (i.e., the motorcycle on its side).

With reference now to FIG. 4a, a schematic illustration shows an accelerometer 64 that is mounted generally horizontally. Once again, if $\Theta$ is the leaning angle of the motorcycle measured from vertical and g is the force of gravity, then the output of the sensor can be calculated by the equation $V=g*SIN(\Theta)$. The output will vary from about −1 g to about 0 g to about +1 g as the motorcycle 10 leans from one extreme through vertical to the other extreme. In addition, as illustrated in FIG. 4b, the sensor output will be negative in one direction and positive in another direction. At an angle of 70 degrees, V=0.94 g and the difference from vertical to 70 degrees is 0–0.94 g=0.94 g. Thus, when detecting an angle of 70 degrees, the horizontally mounted accelerometer 64 undergoes a larger range of output than the vertically mounted accelerometer. Additionally, the output of the horizontal accelerometer changes from 0.94 g to about 1 g when the lean angle changes from 70 degrees to 90 degrees. Thus, this difference in output is about 0.06 g.

In view of the above discussion, it has been determined that mounting the accelerometer 64 in both orientations leads to certain benefits. For instance, because the difference in voltage output levels from 0 to 70 degree lean is greater when the accelerometer 64 is mounted horizontally than when the accelerometer is mounted vertically, horizontally mounting the accelerometer results in a system that is less affected by noise when determining when a lean angle of the motorcycle 10 is great enough to indicate a fall. Furthermore, lateral placement allows for directional detection of the lean (i.e., positive output one way and negative output the other), which can be used in other control strategies. Vertical placement, however, affords the advantage that a larger mounting angle tolerance is provided. In other words, because the voltage difference between 70 degrees and 90 degrees, for instance, is large, misalignment of the sensor does not have as large an impact on the output of the sensor surpassing the exemplary threshold of 70 degrees. Thus, more tolerance is provided. The increased tolerance, however, may demand a tighter control of the noise level within the circuit such that the noise does not cause a false detection.

Figure 5:
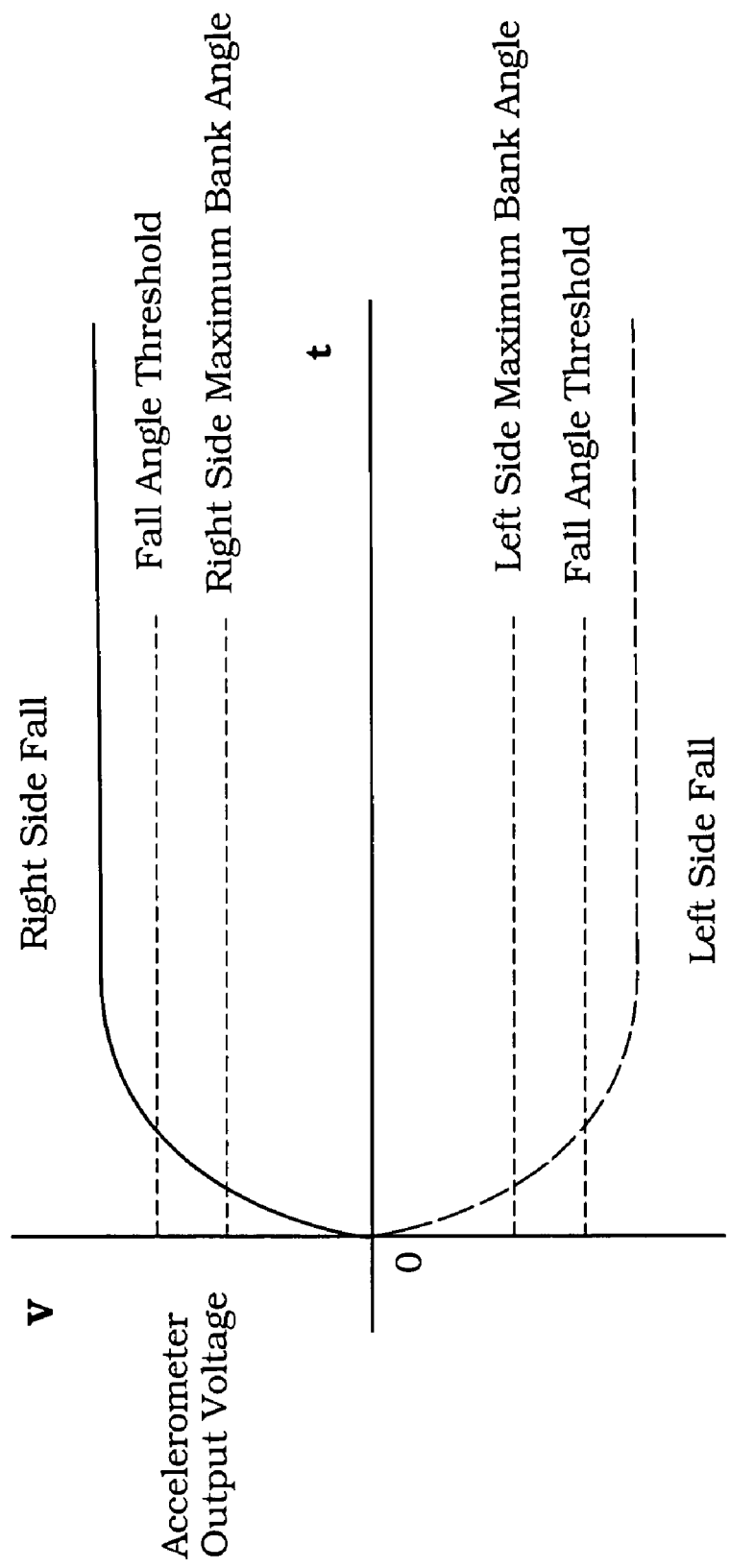
FIG. 5 is a graphical depiction illustrating accelerometer output voltage over time in accordance with a right and left side fall when the accelerometer is mounted generally horizontally.

With reference now to FIG. 5, an exemplary graphical depiction of output from the accelerometer 64, which is horizontally mounted, is illustrated. The output is shown over time during a fall to the right side by solid lines and during a fall to the left side by dashed lines. As illustrated, the output assumes a general cosine curve pattern until the motorcycle has fallen completely onto its side. In addition, a maximum bank angle is illustrated. The maximum bank angle preferably corresponds to an angle at which the motorcycle can be leaned while being ridden without encountering significant loss of control or sliding (i.e., the maximum recoverable lean). Of course, greater angles of lean can be maintained under certain conditions. Thus, a fall angle threshold is set somewhat higher than the maximum angle. In the illustrated arrangement, the angle is set to approximately 70 degrees from vertical, for instance. The threshold angle can be set to any angle depending upon the application and the vehicle dynamics and geometry. As illustrated, the leaning of the vehicle having an accelerometer mounted substantially horizontally and in accordance with certain features and aspects of the present invention advantageously results in curves that are mirrored about a zero point.

Control Strategies

Several control strategies that can be used with the above-described configuration will now be described. The control strategies described may be in the form of a hard-wired feedback control circuit in some configurations. Alternatively, the control strategies may be constructed of a dedicated processor and memory for storing a computer program configured to perform the steps described above in the context of the flowcharts. Additionally, the control strategies may be constructed of a general purpose computer having a general purpose processor and memory for storing the computer program for performing the routines. Preferably, the control strategies described below are incorporated for use in the ECU 28.

Each of the following control strategies can be provided as a subroutine that interrupts a main routine that operates while the motorcycle 10 is running. The interruption can occur, for example, at intervals that are spaced by several milliseconds. The control strategies can be incorporated into a larger software program. Accordingly, each of the control strategies can be but one of a number of routines being processed within the ECU 28.

Fall Control Routine

Figure 6:
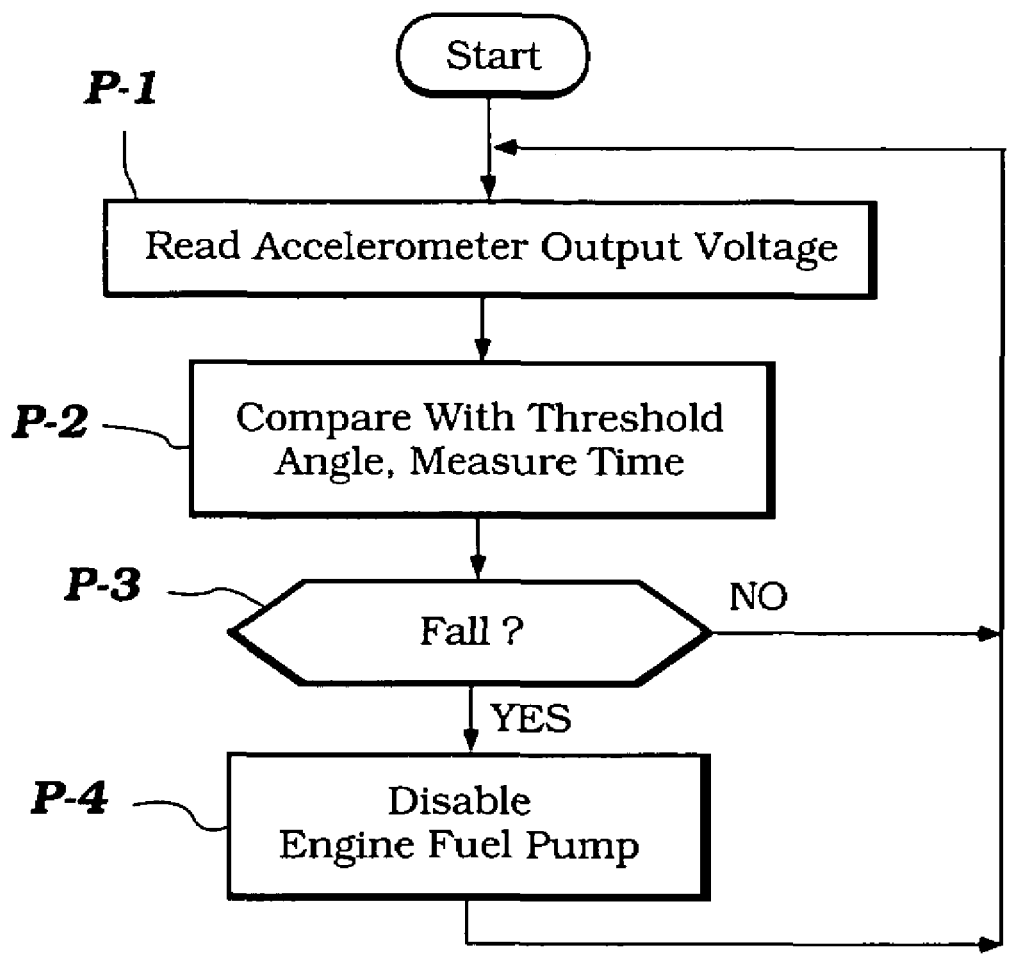
FIG. 6 is a flowchart showing an exemplary control routine arranged and configured in accordance with certain features, aspects, and advantages of the present invention. The routine basically shuts down certain engine operations in the event of the motorcycle leaning to a side beyond a recoverable lean.

With reference now to FIG. 6, a control arrangement is shown that is arranged and configured in accordance with certain features, aspects, and advantages of the present invention. The routine basically evaluates whether the motorcycle 10 is operating under conditions likely to produce a fall of the motorcycle to the ground. If such conditions are detected, the control routine provides that certain components are disabled.

The illustrated control routine begins and moves to a first operation block P1 in which it detects the output voltage of accelerometer 64. As explained above, the output voltage is representative of the lean angle of the motorcycle 10. This data is received by the control circuit 33.

Next, in an operation block P-2, a threshold voltage level is retrieved. The threshold voltage preferably corresponds to a voltage value that indicates to a lean angle that exceeds a desired operational angle. For instance, the threshold angle may be about 70 degrees in some applications and the corresponding voltage output from the accelerometer 64 then is used as the threshold voltage level. Other values also can be used, as discussed above.

In decision block P-3, the data that has been received by the control circuit 33 is compared to a threshold voltage. By comparing the data to a preset threshold voltage, the ECU can evaluate whether the detected angle is greater than the preset fall threshold, which indicates operation in a manner likely to cause a fall. In some arrangements, a time dwell also may be preset such that any output from the accelerometer that is greater than the preset fall threshold must be maintained above the threshold for a preset period of time. The time dwell may act as an effective filter because it reduces the likelihood that vibration and road noise can cause a false fall detection. Other filtering arrangements also can be used.

If it is determined that a fall has not occurred, then the pass through the routine ends without changing the operation of the motorcycle or the engine. If a fall has occurred, however, the ECU 12 ceases preferably engine operation by interrupting either the ignition system 58 or the fuel injection system 60 in operation block P-4 and the routine ends. To stop fuel injection, the solenoid that powers the fuel injector is operated to close the valve within the fuel injector such that no fuel can be injected into the combustion chamber or induction system. Additionally, in the illustrated arrangement, the fuel pump is deactivated to reduce the likelihood that fuel will continue to be pumped after the motorcycle has fallen.

While it is not illustrated, in order to resume vehicle operation after a fall has been detected, the operator returns the motorcycle to an upright position. If the main switch is off, the switch can be turned to the on position. When the main switch is turned on, the fuel pump is activated and the pressure within the fuel supply system increases. The starter switch then is activated and the motorcycle can be started if no further problems have been detected. After the motorcycle has started, fuel supply and ignition operate under the control of a suitable normal operational mode control routine.

Zero Point Setting Routine

The illustrated arrangements advantageously employ the accelerometer 64 to affect numerous control routines. These control routines, to greater and lesser degrees, rely upon the accurate detection of various modes of vehicle operation. The accuracy of detection may vary from motorcycle to motorcycle due to manufacturing tolerances in the sensor, the ECU, the circuitry and the motorcycle itself. Accordingly, a method by which the accelerometer can be adjusted following assembly of the motorcycle is desired.

Figure 7:
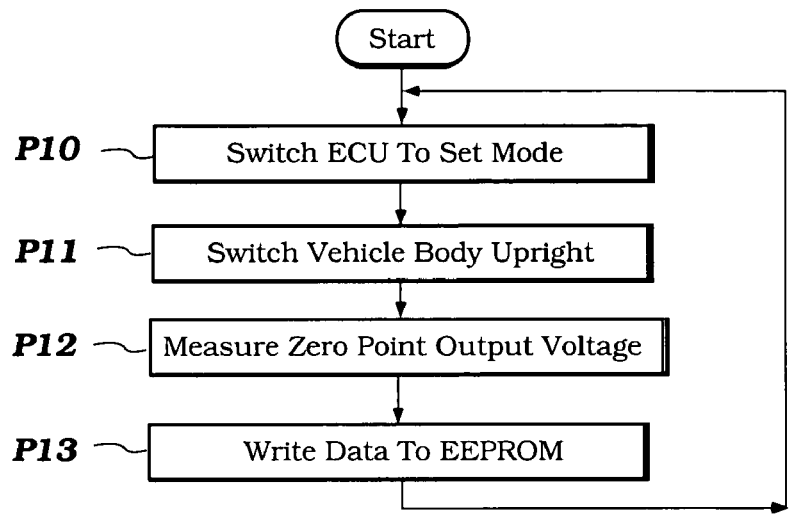
FIG. 7 is a flowchart showing another control routine arranged and configured in accordance with certain features, aspects and advantages of the present invention. The routine basically provides a manner to correct for manufacturing tolerance deviations in sensor mounting.

FIG. 7 represents an exemplary technique for zero point setting the accelerometer 64. This method is particularly advantageous with respect to the horizontally mounted accelerometer; however, the method can be used with vertically mounted accelerometers if desired. The method generally involves obtaining appropriate correction data and writing that data into a memory location, such as a write-enabled nonvolatile memory bank. In some arrangements, this correction data is stored in an EEPROM (electronically erasable programmable read-only memory). This correction data then can be used in combination with actually detected value to arrive at a "zeroed" data value. Because the correction data is obtained after the accelerometer and the ECU have been mounted to the particular motorcycle, the correction data generally will be accurate in each installation regardless of the accuracy with which the ECU and accelerometer have been mounted.

Preferably, the routine of FIG. 7 is carried out while the ECU is in a test mode during and just subsequent to vehicle manufacture or repair. In a first operation block P10, the ECU is set to test mode. In operation block P11, the motorcycle 10 is arranged to be in an upright position by using a center stand or centering jig. The accelerometer will be zeroed with the vehicle in this position. In an operation block P12, the accelerometer output voltage is measured with the motorcycle stabilized in the upright position. In some applications, this voltage can be read while the motorcycle is on a center stand prior to operation. For instance, upon every start or periodically during start up, the voltage can be read while the motorcycle is on the center stand. Thus, the data can be updated to accommodate any disturbances to the system. The measured accelerometer output voltage from the accelerometer is set as correction data and written to memory that can be accessed by the ECU in an operation block P13. The data can be written in EEPROM in some applications. The correction data is then used to correct the output values from the accelerometer during normal operation by taking account of any misalignments with true vertical in the system. After the correction data is set, the ECU is returned to a normal operational mode and the routine ends.

Corrected Lean Detection Routine

Figure 8:
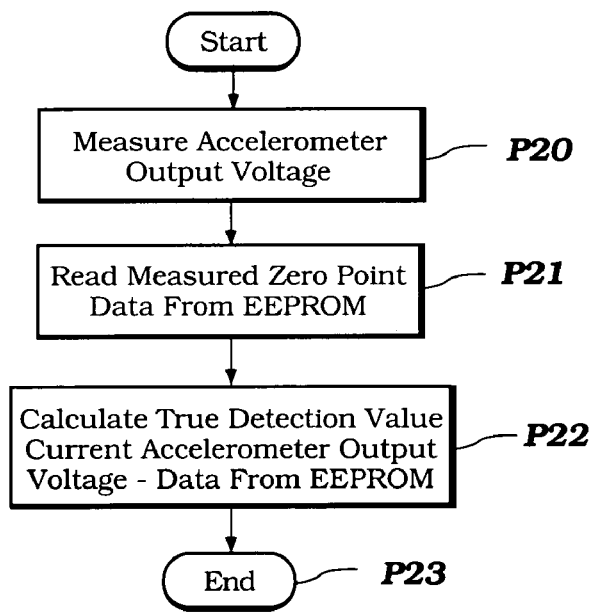
FIG. 8 is a flowchart showing another control routine arranged and configured in accordance with certain features, aspects and advantages of the present invention. The routine basically provides a manner to correct data output from an accelerometer based on correction values derived following manufacturing or repair, for instance.

With reference now to FIG. 8, a control arrangement is shown that is arranged and configured in accordance with certain features, aspects, and advantages of the present invention. The routine basically supplements the routine described above and illustrated in FIG. 6. In short, the following routine can be performed as an interrupt between P1 and P2 in the routine illustrated in FIG. 6.

In this routine, the output of the accelerometer 64 is received (P20). The correction data are then read from the memory location to which they were assigned (i.e., the EEPROM in the ECU 28). The correction data can be read simultaneously with obtaining the output from the accelerometer 64. The correction data is the subtracted from the output from the accelerometer 64 to determine a true reading on vehicle transverse attitude or lean (P22). This value can be converted into an angle if desired and either the angle or the voltage value then can be output to the routine of FIG. 6, for instance. The routine then ends P23.

Collision Detection Routine

Figure 9:
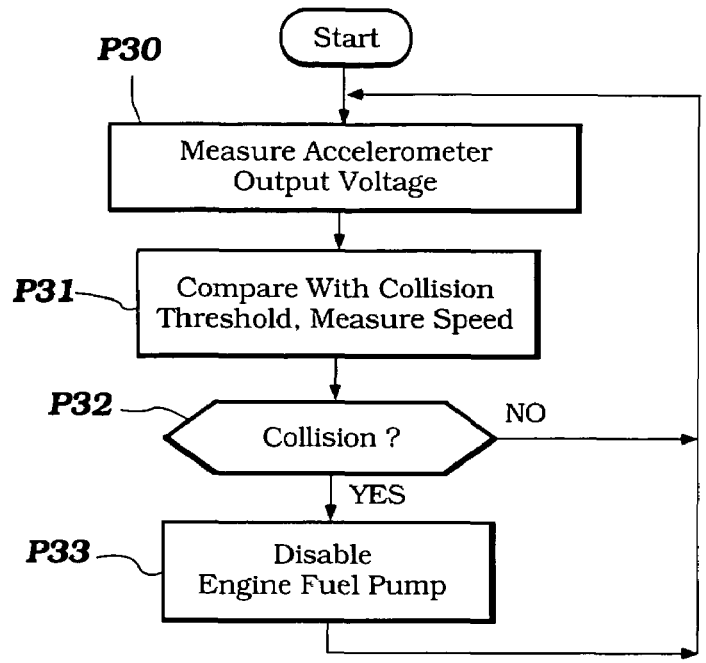
FIG. 9 is a flowchart showing a further control routine arranged and configured in accordance with certain features, aspects and advantages of the present invention. The routine basically shuts down certain engine operations in the event of a collision.

With reference now to FIG. 9, a control arrangement is shown that is arranged and configured in accordance with certain features, aspects, and advantages of the present invention. The routine basically evaluates whether a collision of the motorcycle 10 has occurred and shuts down certain components associated with the engine when such a collision has occurred. To detect whether a collision has occurred, the acceleration of the vehicle in a forward and reverse direction is detected rather than in a side to side direction.

In a first operation block P30, acceleration or deceleration is detected. This detection is based upon the output from the accelerometer 64. In some applications, an X-Y accelerometer is used that allows acceleration in two cross-directions to be detected. In other applications, a dedicated accelerometer is used for detecting acceleration in the fore and aft direction.

Motorcycle speed is detected in an operation block P31. As described above, vehicle speed can be detected in any suitable manner, such as a speedometer or the like. Also in operation block P31, the measured value from the accelerometer is compared with a threshold deceleration value. Based on this comparison, a determination is made as to whether a collision has occurred (P32). Collisions are determined to have occurred if the deceleration is abnormally greater than a rate associated with panic or rapid braking during ordinary driving. Thus, the rate associated with panic braking can be set as a threshold and if the output from the accelerometer exceeds this threshold and the vehicle speed has reduced to zero or about zero, then a collision has occurred. It is possible to also add a dwell time such that the determination of a collision only results if the requisite conditions have been met for a preset period of time. The dwell time can help reduce the likelihood of a false collision detection. Of course, other filtering techniques also can be used.

If a collision has occurred, the ECU ceases engine operation by interrupting either the ignition system 58 or the fuel injection 60 (P33). In some arrangements, operation of the fuel pump is stopped to reduce the likelihood of a fuel spill. If a collision has not occurred, the control routine returns. While not illustrated, motorcycle operation can be resumed in the manner set forth above with respect to fall control routine.

Figure 10:
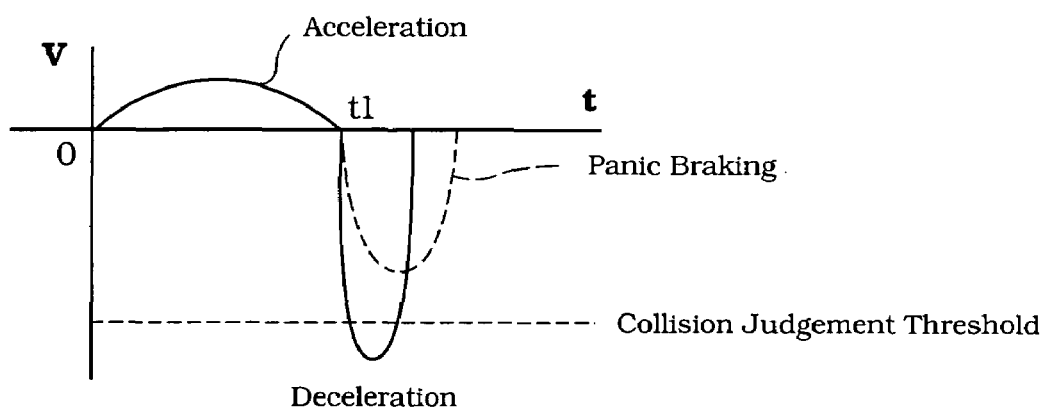
FIG. 10 is a graphical depiction showing accelerometer output voltage over time during various acceleration and deceleration situations.

With reference now to FIG. 10, a graphical illustration is provided of an exemplary data readout during panic braking (in dashed lines) and during a collision. As illustrated, the threshold deceleration value can be disposed between a maximum deceleration expected to be encountered during panic braking (i.e., throttle off and fuel brakes applied—with or without an automatic braking system) and a maximum deceleration that may be encountered due to a lower speed collision. By setting the threshold at this level, the number of false collision detections can be further reduced. As also illustrated, the deceleration spike encountered during collisions also can be helpful in determining a collision condition by detecting the degree of deceleration and the short time period over which that peak has occurred.

Acceleration Control Routine

Figure 11:
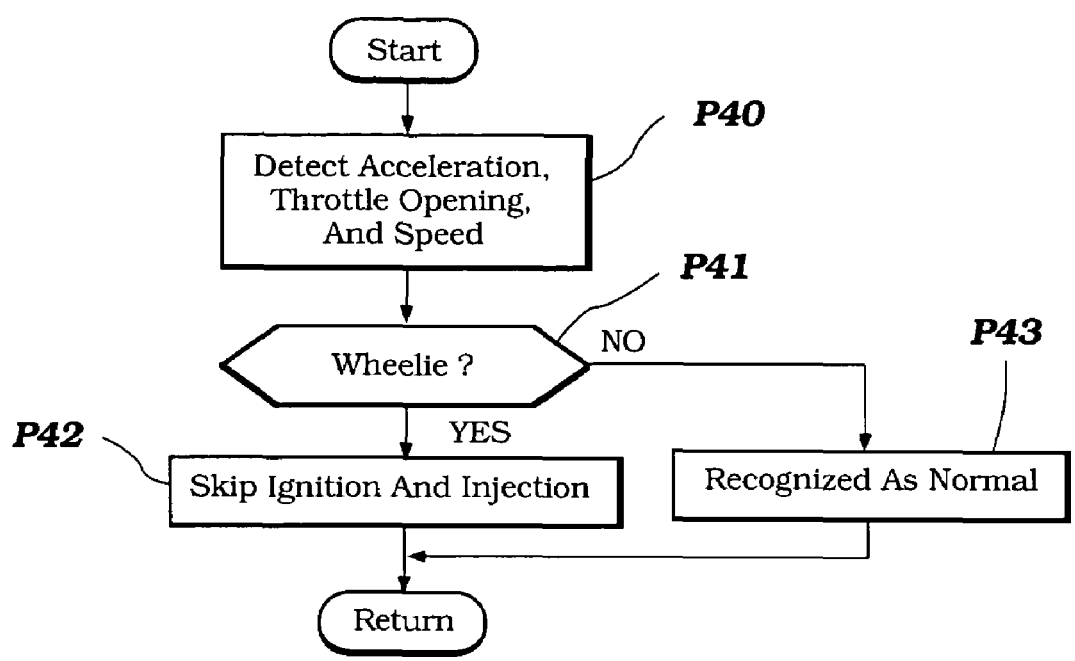
FIG. 11 is a flowchart showing a further control routine arranged and configured in accordance with certain features, aspects and advantages of the present invention. The routine basically reduces engine output to reduce the length or likelihood of a wheelie operational mode.

With reference now to FIG. 11, control routine is shown that is arranged and configured in accordance with certain features, aspects, and advantages of the present invention. In accordance with this routine, a wheelie-mode of vehicle operation is detected and the output of the engine is varied to reduce the length or likelihood of such an operational mode. The following routine can be integrated into the fuel injection or ignition system control routines.

With continued reference to FIG. 2, data are received and stored from the acceleration sensor 64, the throttle sensor 54 and the vehicle speed sensor 56 in an operation block. See P40.

In a decision block, these data can be compared to different preset values to evaluate whether the vehicle has entered a wheelie operational mode. See P41. For instance, the output from the acceleration sensor 64 can be compared against a preset threshold value, such as 0.9 g, where g represents gravitational acceleration. The sensor output generally will increase as the vehicle pitches rearward under acceleration. During normal acceleration in which wheelies are seldom encountered in one application, the output from the acceleration sensor 64 increases from between about 0.2 g to about 0.5 g. Other values can be used depending upon the geometry of the vehicle and the output of the engine, among other variables. In other words, the value of the threshold can be empirically derived for the particular application such that the acceleration mode of motorcycle operation is quickly detected. Relying upon the acceleration sensor 64 allows an actual wheelie operational mode to be detected. In addition, depending upon the threshold value selected, an imminent wheelie operational mode can be detected.

Preferably, a short preset period of time (e.g. one second) is used to extend the length over which the threshold must be exceeded. In other words, the output from the acceleration sensor 64 would have to exceed the threshold for longer than the preset period of time before the ECU 28 would begin to control engine output in a manner that will be described below. The dwell time serves a filtering function to help reduce the number of false detections resulting from vibration and other system noise.

The output from the throttle opening sensor 54 and the vehicle speed sensor 56 also are used to evaluate whether the vehicle is entering or has entered a wheelie operational mode. In particular, if the throttle opening detected by the throttle opening sensor 54 is above a certain threshold opening (e.g., about 80%), and if the detected vehicle speed is below a threshold speed (e.g., slightly above a speed associated with engine idle), then a wheelie operational mode is likely. In some arrangements, the vehicle speed used as the threshold speed can be varied during operation of the vehicle. For instance, when starting from a standstill, a first vehicle speed may be used and, when accelerating from a slow but forward moving speed, a second vehicle speed that is higher than the first vehicle speed can be used. In this manner, it is possible to better detect an imminent wheelie operational mode.

In one presently preferred arrangement, the output from the acceleration sensor 64 and the throttle opening sensor 54 are used together to determine whether a wheelie operational mode has begun. For instance, if the acceleration sensor 64 outputs a value of about 0.9 g and the throttle position is greater than about 80%, then the control circuit 33 or the ECU 28 in general has detected a wheelie operational mode. Vehicle speed also can be used in this determination in some applications. In some particularly advantageous arrangements, vehicle speed ranges in which wheelie mode operation is possible are set and, if the vehicle is operating outside of the set range, wheelie mode detection can be stopped.

After a wheelie operational mode has been detected (see P41), corrective action is initiated by the ECU 28 (P42). In one arrangement, the ECU 28 controls the ignition unit 44 and begins to slow the frequency of ignition. In another arrangement, the ECU 28 controls the fuel supply system 46 and begins to lower the amount of fuel injected by the fuel injection unit 60 and/or begins to slow the frequency of fuel injection. Of course, in some configurations, both the ignition and the fuel supply are controlled together in a suitable coordinated manner. The object of this control is to reduce the output of the engine to slow the vehicle's acceleration.

In a preferred arrangement, the corrective action is controlled in intervals such that the engine output and vehicle acceleration are gradually slowed. For instance, in one arrangement, the engine output is lowered in about 20% steps such that the output decline progresses from 100% to 80% to 60% while the front wheel lowers gradually to a non-wheelie operational mode. Preferably, the steps are dependent upon sensed vehicle speed. In other applications, non-linear control can be used. Additionally, the manner in which the output is decreased can vary depending upon the detected vehicle speed. In some arrangements, the throttle opening can be adjusted such that the front wheel of the vehicle gradually lowers.

If the corrective action involves adjusting the output of the ignition unit 62, the introduction of current to the ignition coil preferably is interrupted at appropriate intervals relative to normal ignition operation such that ignition is stopped at appropriate intervals. If the corrective action involves adjusting the fuel supply, the introduction of current to the coil of the fuel injector solenoid preferably is interrupted at appropriate intervals relative to normal fuel injection operation such that injection is stopped at desired intervals.

If the vehicle determined to be in a non-wheelie operational mode, then engine operation continues to be controlled with normal operating parameters (P43). Additionally, while not illustrated, if the vehicle previously was in a wheelie operational mode but has been returned under control of the ECU to a non-wheelie operational mode, then the engine output preferably is gradually increased to 100%. For instance, the ECU 28 may gradually increase the engine output in 20% steps based on vehicle speed or the like. In this manner, the likelihood of reentering a wheelie operational mode upon return to normal operation is decreased.

Alarm Unit Constructions

The illustrated arrangement of FIG. 2 also features an alarm system 66. The alarm system 66 features a simplified construction relative to prior art units. In particular, the alarm system 66 uses a single accelerometer for theft detection as well as other control arrangements that are used during motorcycle operation, such as fall detection and/or wheelie operational mode detection, for instance. Additionally, in the illustrated arrangement, the accelerometer 64 is a semiconductor-based accelerometer that is mounted within the ECU 28. Thus, the alarm system 66 is readily incorporated into the ECU 28 and the additional space usually occupied by the mechanical sensor normally used in alarm system, as well as the additional space usually occupied by a separate alarm system, can be used by other vehicle components.

As illustrated, the acceleration sensor 64 is mounted within the ECU 28. Power from the battery 36 is provided through the main switch 34 to the power circuit 38 for the ECU 28. This power circuit provides power to the acceleration sensor 64 during normal operation of the motorcycle 10. Output from the acceleration sensor 64 is provided to the control circuit 33 of the ECU 28. More particularly, in the illustrated arrangement, the output is provided to a fall detection circuit 68 that is provided within the control circuit 33. The output also can be provided to a wheelie detection circuit or can simply be used in a software routine.

In the illustrated arrangement, a filter circuit 40, which is powered by the power circuit 38 for the ECU 28, is interposed between the acceleration sensor 64 and the control circuit 33 such that noise and vibration components can be removed from the output of the acceleration sensor 64. The filter circuit 40 may be constructed as hardware with resistors and capacitors or can be configured through software implementations that process the output from the acceleration sensor 64. The filter circuit 40 also can be construction with both hardware and software.

The output from the control circuit 33 preferably is provided to the drive circuit 42, which also is powered by the power circuit 38 for the ECU 28. The drive circuit 42 in the illustrated arrangement is used to control the ignition unit 44 and the fuel supply system 46. The components described thus far are powered by the ECU power circuit 38 through ECU-purpose power terminals 70. Thus, one configuration of an engine control system comprises the acceleration sensor 64, the filter 44, the control circuit 33 and the drive circuit 42. In some arrangements, the ECU power circuit 38 provides power that has been stepped down from about 12 volts to about 5 volts to the engine control system through an engine control circuit. Other suitable arrangements also are possible.

Output from the acceleration sensor 64 also is used by the control circuit 33 to detect vibrations during nonuse of the motorcycle 10. The vibrations sensed generally indicate theft or unauthorized tampering with the vehicle. In particular, the output from the acceleration sensor 64 is provided to a vibration detection circuit 72 formed within the control circuit 33 of the ECU 28. In some arrangements, the output from the acceleration sensor 64 can be provided to the alarm device 62, which can comprise any suitable auditory or visual alarm device (e.g., lights, siren, buzzer, etc.).

A capacitor circuit 74 is provided between the acceleration sensor 64 and the control circuit 33. The capacitor circuit 74 advantageously is configured to remove at least a portion of the low level vibration elements of the signals being output by the acceleration sensor 64. In some arrangements, the capacitor circuit 74 can include a calculation process circuit for processing the signals from the acceleration circuit and, in some arrangements, a primary filter can be provided between the acceleration sensor 64 and the capacitor circuit 74 to remove additional noise from the output of the acceleration sensor 64. In other arrangements, the capacitor circuit 74 can be connected to the filter circuit 40 to remove error components before the vibration detection circuit 72 detects the vibration components of the sensor output. In still other arrangements, a calculation process circuit can be used in place of the capacitor circuit 74. Software or hardwired configurations are possible.

The vibration detection circuit preferably detects vibration of a magnitude greater than a specified value from the signal coming from the acceleration sensor 64. If the vibration magnitude exceeds the specified value then the vibration detection circuit 72 activates the alarm device 62 to produce a suitable alarm output. The alarm device preferably is physically separated from the ECU. A suitable drive circuit for the alarm device 62 can be provided in some arrangements such that the vibration detection circuit 72 drives the drive circuit (not shown) to operate the alarm device 62. Preferably, the drive circuit is provided integrally with the alarm device 62. In some applications, the vibration detection circuit 72 also can be provided on the alarm device 62 rather than within the ECU 28.

With reference again to FIG. 2, the battery 36 preferably is connected to an alarm circuit 76 independently of the engine control system described a few paragraphs above. The output from the battery 36 is advantageously stepped down to a desired level. This stepped down power is provided to alarm-purpose power terminals 78 and the voltage can be determined based upon the voltage required to power the alarm drive circuit in some arrangements. The illustrated arrangement has alarm-purpose power terminals 78 provided to the acceleration sensor 64, the capacitor circuit 78, the vibration detection circuit 72 and the alarm device 78. Thus, an alarm control system comprises at least these components.

Figure 12A:
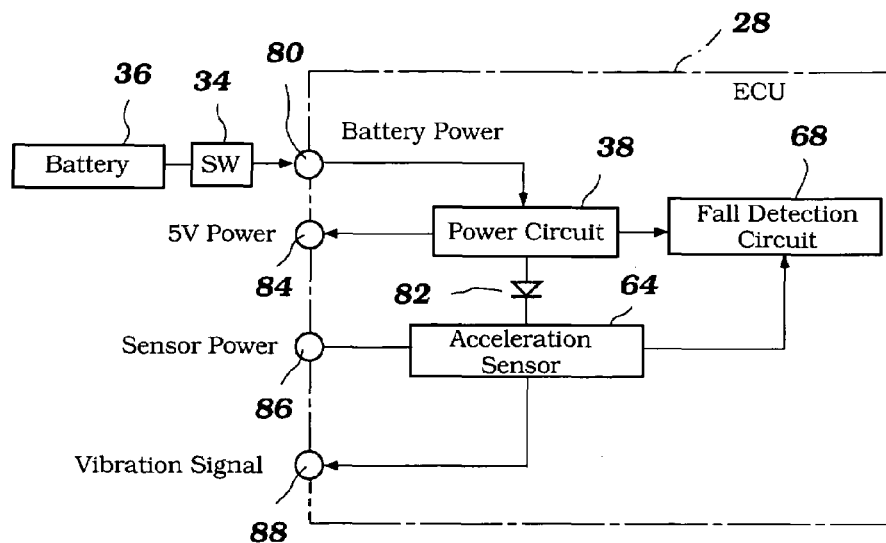
FIGS. 12a and 12b are schematic diagrams showing the ECU with various inputs and outputs that can be used in accordance with certain features, aspects, and advantages of the present invention.
Figure 12B:
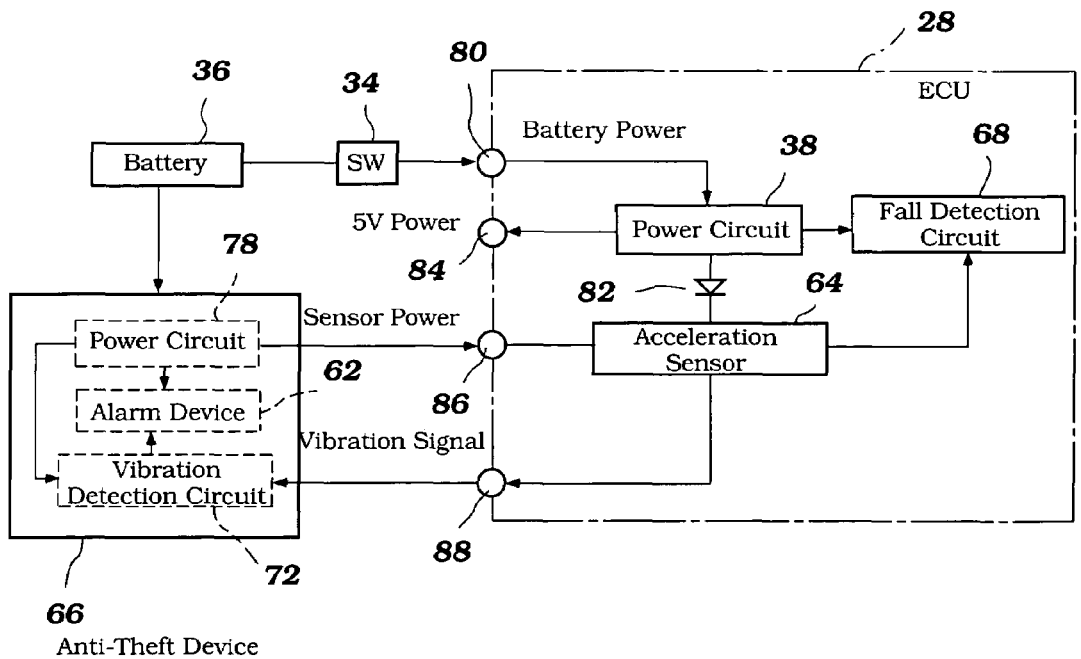

It should be noted that the alarm system can be formed as a self-contained unit that is separable from the ECU 28. In such arrangements, the capacitor circuit 78, the vibration detection circuit 72, the alarm device 78 and the power circuit 76 can be provided external to the ECU 28. With reference now to FIGS. 12a and 12b, an exemplary construction is illustrated in which the alarm system forms a separable unit that can be added to the ECU 28 as desired. This construction has the advantage that the control circuit 33 is not powered when the main switch 34 is in the off position.

With reference now to FIG. 12a, the battery 36 provides power through the main switch 34 to a first terminal 80 of the ECU 28. The first terminal 80 connects the switch 34 to the ECU power circuit 38. The ECU power circuit steps down the voltage, as described above, to about 5 to about 8 volts. The stepped down voltage is supplied to the acceleration sensor 64 through a diode 82. The diode ensures that power only flows from the ECU power circuit 38 to the acceleration sensor 64 and that substantial power cannot flow from the acceleration sensor 64 to the ECU power circuit 38 for reasons that will be discussed. The stepped down voltage also is supplied to the fall detection circuit 68, which is described above.

The ECU also has an output terminal 84 that allows voltage to be drawn from the ECU 28 for desired uses. In addition, a sensor power terminal 86 is provided and a sensor signal output terminal 88 is provided. The sensor signal output terminal 88 receives vibration signals from the acceleration sensor 64. These terminals 86, 88 are connected to the acceleration sensor 64.

In the arrangement of FIG. 12a, when the main switch 34 is in the power on position, control-purpose power is applied to the ECU 28. Thus, the acceleration sensor 64 can be used by the ECU to carry out any suitable vehicle control routine, such as the routines described above. When the main switch 34 is in the power off position, the ECU 28 preferably does not receive power.

With reference now to FIG. 12b, the alarm system 66 is shown mounted to the ECU 28. As illustrated, the alarm system 66 advantageously is a stand-alone unit that allows the alarm system 66 to be a conveniently installed option in factory prepared motorcycles. The alarm system 66 includes the power circuit 78, the alarm device 62 and the vibration detection circuit 72. In some arrangements, the capacitor circuit 74 can be included within the alarm system 66 as well.

The battery 36 is connected to the alarm system 66 and the components of the alarm system 66 preferably receive a stepped down power supply from the battery 36. Preferably, the voltage is stepped down from about 12 volts to about 5 volts. Through the sensor power terminal 86, power is provided to the acceleration sensor 64 from the power circuit 78. Because the diode 82 limits power flow from the acceleration sensor 64 to the power circuit 38, unnecessary power use is reduced. Vibration signals are transmitted from the acceleration sensor 64 to the vibration detection circuit 72 of the alarm system 66 through the vibration signal terminal 88.

Thus, in the arrangement of FIGS. 12a and 12b, the alarm system 66 is separate from the ECU 28 and is separately powered. The ECU 28 and the alarm system 66 are connected through the joint use of the acceleration sensor 64, which reduces the cost of the combined system.

Although the present invention has been described in terms of a certain preferred embodiments, other embodiments apparent to those of ordinary skill in the art also are within the scope of this invention. Thus, various changes and modifications may be made without departing from the spirit and scope of the invention. For instance, various steps within the routines may be combined, separated, or reordered. In addition, some of the conditions sensed (e.g., engine speed and acceleration) to determine certain operating parameters (e.g., motorcycle falling or colliding) can be replaced by other indicators of the same or similar operating conditions. Moreover, not all of the features, aspects and advantages are necessarily required to practice the present invention. Accordingly, the scope of the present invention is intended to be defined only by the claims that follow.

What is claimed is:

1. A wheeled vehicle comprising a frame, a front wheel steerably attached to the frame, a rear wheel attached to the frame, a motive member mounted to the frame and delivering a torque to the rear wheel, a control unit electrically connected to the motive member and comprising an outer housing, an accelerometer mounted within the outer housing and electrically communicating with the control unit, the accelerometer adapted to output an output signal that varies with the rate of forward acceleration, said control unit adapted to compare said output signal to a front wheel lifting acceleration range signal and said control unit further adapted to reduce the output of said motive member if said output signal exceeds said front wheel lifting acceleration range signal and when a vehicle is within a predetermined vehicle speed range and when a throttle is within a predetermined throttle position range.

2. The vehicle of claim 1, wherein said accelerometer is mounted generally horizontally.

3. The vehicle of claim 1, wherein said output signal varies as a mathematical sine of said pitching angle of the vehicle caused by rapid deceleration.

4. A method of controlling operations of a vehicle during acceleration, the vehicle having an electronic control unit that comprises a control circuit that is in electrical communication with a semiconductor accelerometer, said electronic control unit adapted to control operation of a motive member, said method comprising sensing an output signal from said accelerometer, sensing a throttle position, and sensing a vehicle speed, comparing said accelerometer output signal with a preset threshold level, comparing said sensed throttle position to a preset throttle angle, comparing said vehicle speed to a threshold speed, decreasing an output of said motive member only if said output signal from said accelerometer exceeds said preset threshold level, said sensed throttle position is greater than said preset throttle angle, and said sensed vehicle speed is less than said threshold speed.

5. The method of claim 4 further comprising decreasing said output only if said output signal exceeds said preset threshold level for a preset period of time.

6. The method of claim 4, wherein said motive member is an internal combustion engine and decreasing an output of said motive member comprises selectively interrupting ignition of said engine.

7. The method of claim 4, wherein said motive member is an internal combustion engine and decreasing an output of said motive member comprises selectively interrupting fuel injection of said engine.

8. The method of claim 4, wherein decreasing an output of said motive member comprises stepping the output down over a period of time.

9. The method of claim 8, wherein said output is stepped down based at least in part upon a sensed vehicle speed.

10. A method of controlling operations of a vehicle during acceleration, the vehicle having an electronic control unit that comprises a control circuit that is in electrical communication with a semiconductor accelerometer, said electronic control unit adapted to control operation of a motive member, said method comprising sensing an output signal from said accelerometer, comparing said output signal with a preset threshold level, if said output signal exceeds said preset threshold level then decreasing an output of said motive member, and returning said output to a normal output level after said output has been decreased, over a period of time, or in a series of increments.

11. A motorcycle comprising a frame, a front wheel steerably attached to the frame, a rear wheel attached to the frame, a motive member mounted to the frame and connected to at least one of the front wheel and the rear wheel, a control unit electrically connected to the motive member and comprising an outer housing, an accelerometer configured to detect acceleration in at least two distinct directions relative to the frame, the accelerometer being mounted within the outer housing and electrically communicating with the control unit, the accelerometer adapted to output an output signal that varies with a leaning angle of the motorcycle when turning, said control unit adapted to compare said output signal to a threshold signal range, said control unit further adapted to decrease the output of said motive member if said output signal is outside said threshold signal range, wherein said control unit is adapted to decrease the output of said motive member only when the vehicle is within a predetermined vehicle speed range, and when a throttle is within a predetermined throttle position range.

* * * * *